United States Patent [19]

Pera

[11] Patent Number: 4,924,765
[45] Date of Patent: May 15, 1990

[54] EQUIPMENT FOR ROASTING COFFEE, HAZLENUTS, PEANUTS AND SIMILAR COMMODITIES

[76] Inventor: Benito Pera, Via dei Pera, 1, Alessandria, Italy, 15100

[21] Appl. No.: 267,084

[22] Filed: Nov. 4, 1988

[30] Foreign Application Priority Data

Nov. 6, 1987 [IT] Italy ............................. 3680 A/87

[51] Int. Cl.$^5$ ..................... A23B 9/00; A23L 3/18; F26B 11/04
[52] U.S. Cl. ........................... 99/348; 34/63; 34/109; 99/470; 99/479; 99/517
[58] Field of Search ............. 99/348, 443 R, 324, 99/470, 473, 474, 475, 476, 477, 479, 517, 361, 362, 367, 368; 34/108, 109, 127, 128, 130, 131, 132, 133, 134, 139, 11, 13, 20, 22, 28, 29, 31, 32, 33, 60, 61, 62, 63, 79, 186, 187; 432/68, 141, 81, 118, 239; 366/144, 224, 228, 227, 234, 235

[56] References Cited

U.S. PATENT DOCUMENTS

| | | | |
|---|---|---|---|
| 346,344 | 7/1886 | Bailey | 34/109 |
| 616,790 | 12/1898 | Hamsley | 34/63 X |
| 836,341 | 11/1906 | Post | 34/109 X |
| 1,007,093 | 10/1911 | Gerster et al. | 99/479 |
| 1,225,212 | 5/1917 | Benjamin | 34/109 X |
| 1,423,818 | 7/1922 | Post | 34/109 |
| 1,426,385 | 8/1922 | Huhn | 34/134 X |
| 1,524,387 | 1/1925 | Burns et al. | 34/63 X |
| 1,995,966 | 3/1935 | Delemme | 34/109 |
| 2,071,293 | 2/1937 | Behr et al. | 34/79 X |
| 2,716,936 | 1/1951 | Kopf | 99/470 X |
| 3,109,718 | 11/1963 | Falla | 99/470 X |
| 3,744,402 | 7/1973 | Piegza et al. | 99/479 X |
| 4,369,585 | 1/1983 | Berkoff et al. | 34/63 |
| 4,688,336 | 8/1987 | Egger et al. | 34/109 |
| 4,785,759 | 11/1988 | Motoyama et al. | 34/133 X |

FOREIGN PATENT DOCUMENTS

| | | | |
|---|---|---|---|
| 693641 | 7/1940 | Fed. Rep. of Germany | 34/109 |
| 44284 | 8/1927 | Norway | 34/128 |
| 476951 | 12/1937 | United Kingdom | 34/109 |
| 946444 | 1/1964 | United Kingdom | 34/128 |

Primary Examiner—Harvey C. Hornsby
Assistant Examiner—Scott J. Haughlund
Attorney, Agent, or Firm—Hoffmann & Baron

[57] ABSTRACT

Raw coffee beans or nuts are put in a revolving drum divided into at least four independant modular sectors each of which carries a given quantity of the product through a succession of similarly independent work stations to be heated, roasted, cooled and discharged ultimately through an outlet. The air used to cool the product is recycled from the roasting station, being drawn from the drum into a separator, freed of any skins or husks that may be entrained from the roast, then directed into a cooling system that lowers its temperature to sub-ambient level before returning it to the drum; the option exists of enriching the recycled air with additional aromas before it finally enters the cooling station.

18 Claims, 5 Drawing Sheets

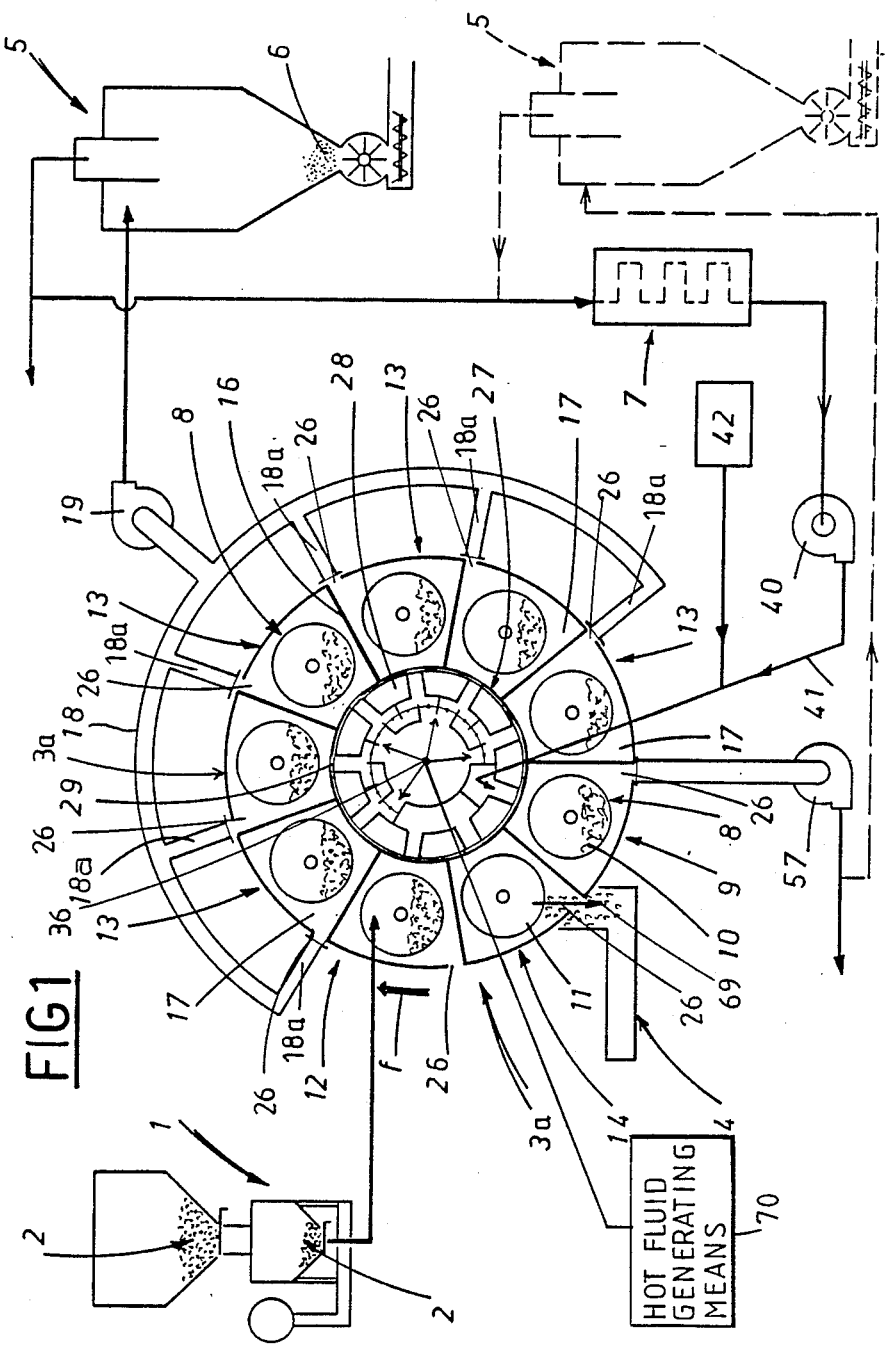

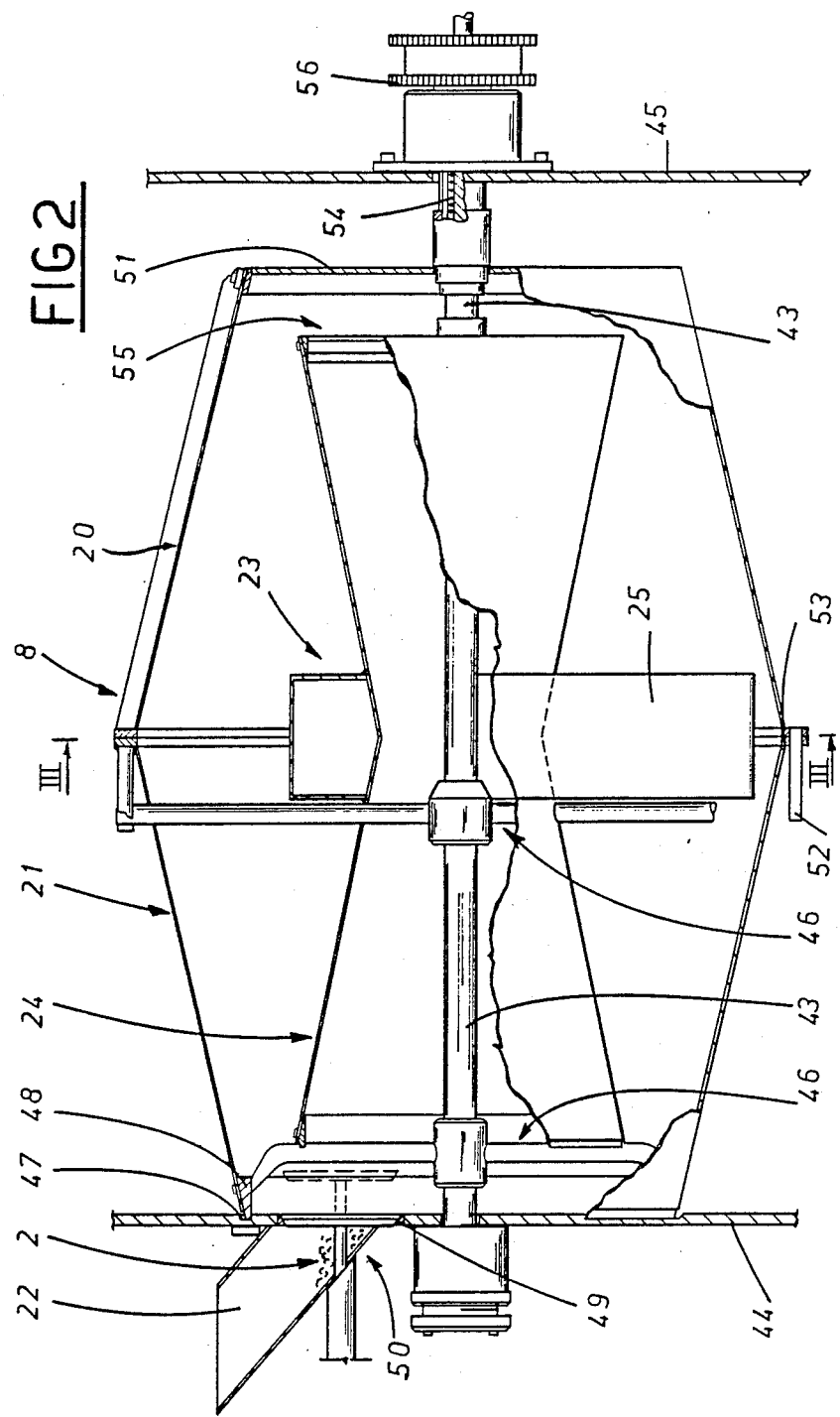

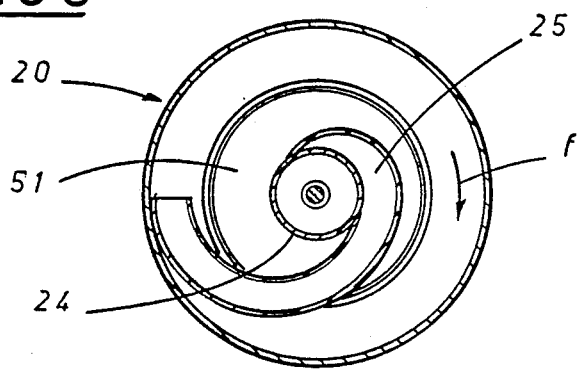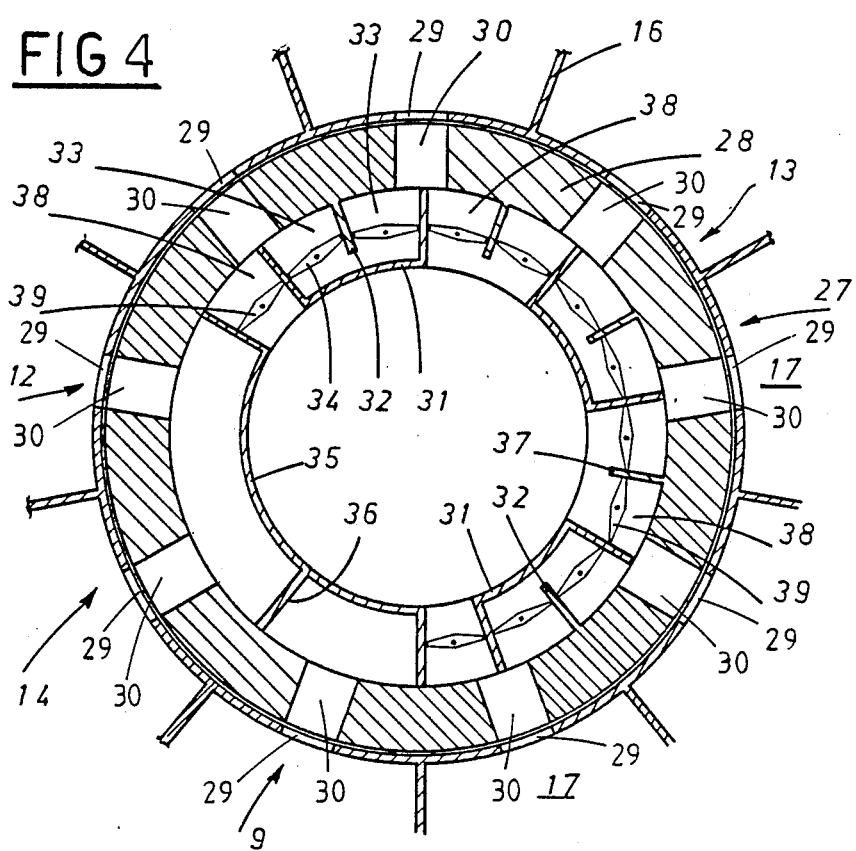

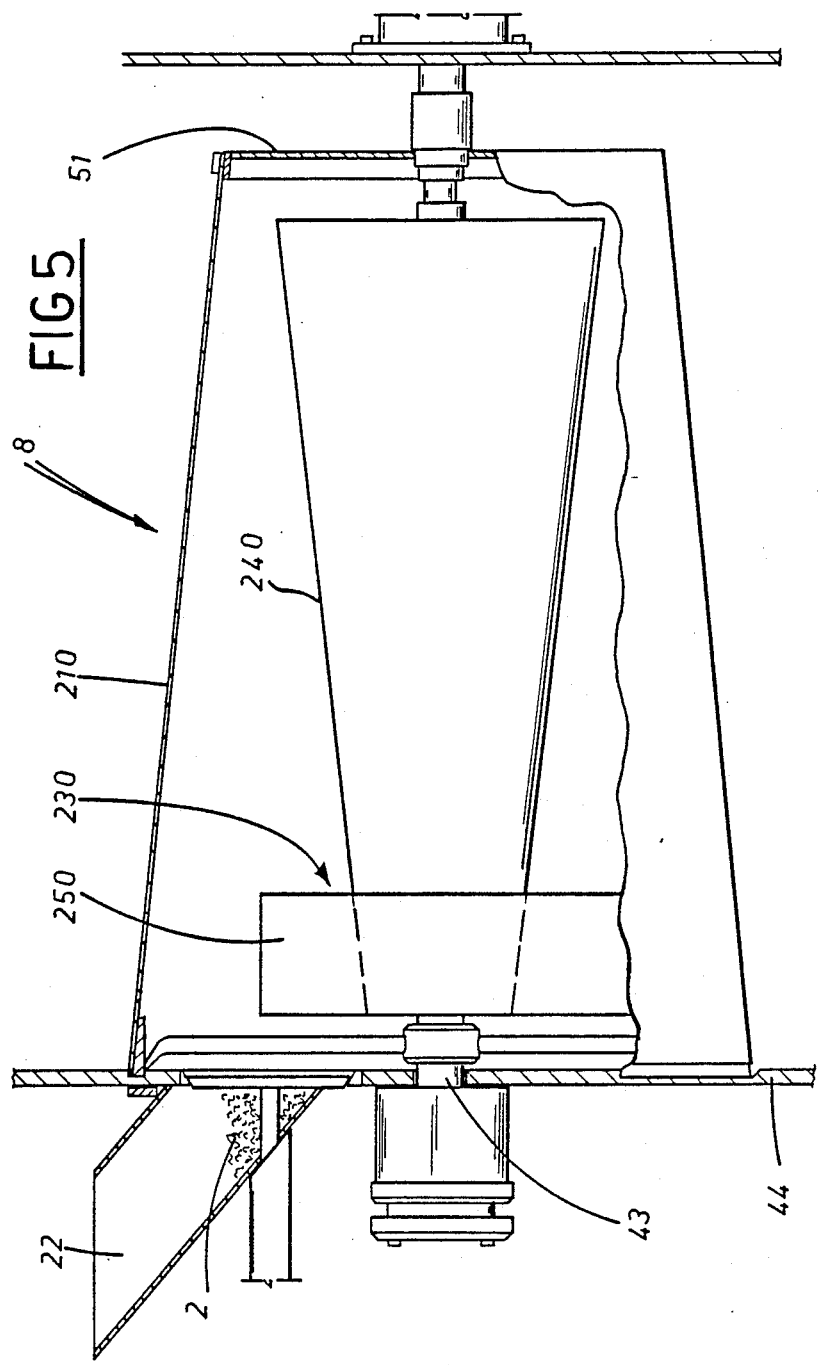

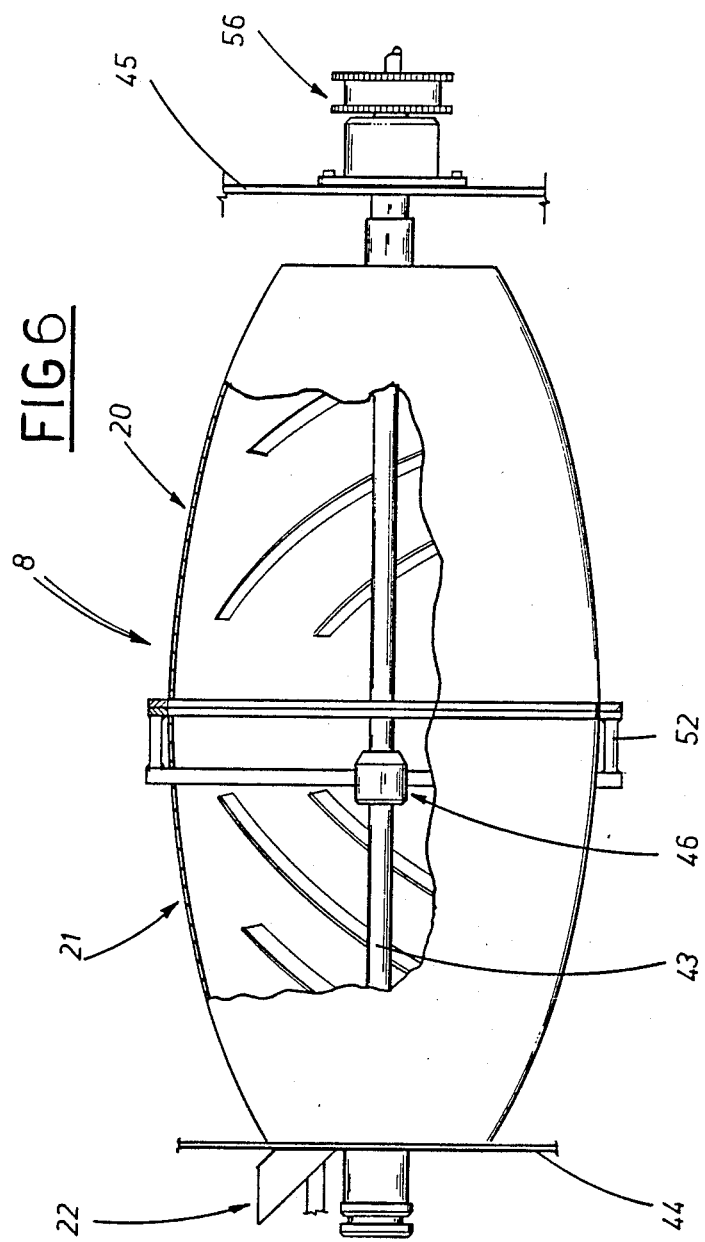

EQUIPMENT FOR ROASTING COFFEE, HAZLENUTS, PEANUTS AND SIMILAR COMMODITIES

BACKGROUND OF THE INVENTION

The invention relates to equipment for roasting commodities such as coffee, hazelnuts, peanuts and similar commodities.

Equipment of the type used for roasting coffee, nuts and other beans consists essentially in a feed system, a device in which the raw commodity is subjected to treatment, a hot air generator, an extractor, a separator-and-disposal unit, a cooling system and a discharge system.

The raw commodity will be supplied by the feeder to the treatment device in prescribed, and variable quantities.

The treatment device consists in one, or at most two revolving drums that rotate about respective horizontal axes and are connected with the hot air generator and the extractor: the extractor is designed to sustain a vacuum in the drums such as will ensure a continual intake of hot air from the generator. Hot air leaves the drum and is exhausted by the extractor into the separator-and-disposal unit, generally a cyclone separator, which proceeds to remove any husks, skins or similar waste from the air stream.

The roasted commodity is then conveyed from the drums to the cooling system, where it is stirred in a container exposed to the surrounding environment, before being transferred finally to the discharge system.

In equipment of the type thus outlined, the full charge-roast-discharge cycle of the rotating drum, or drums, has to be implemented fragmentarily, as it is impossible to fill and empty the drum at one and the same time.

Thus it happens that operation of the equipment, when considered in its entirety, is non-continuous, with down time accumulating in proportion to the capacity of the roasting drums.

Accordingly, the object of the invention is to design roasting equipment capable of continuous operation.

SUMMARY OF THE INVENTION

The stated object is realized fully with roasting equipment as recited in the appended claims. According to the invention, the device in which treatment of the commodity is effected consists in a drum, rotatable about its own axis and divided into at least four distinct and independent sectors of modular embodiment, each of which accommodates a relative planet drum, likewise rotatable about its own axis, in which the commodity is carried.

As the main drum rotates, the sectors and their relative drums are taken through a succession of stations, likewise distinct and independent: the commodity therefore undergoes a different treatment at each station, from initial infeed of the raw commodity to final discharge of the end product, and each station is occupied by at least one sector at any given moment.

Accordingly, while any one planet drum is charged, another drum will be discharging, and there is substantially no break in continuity.

One advantage of the invention is the facility it provides of supplying hot and/or cold fluids to each sector independently, hence of responding to given requirements by varying the temperatures to which the raw commodity is subjected gradually at the heating and roasting station.

A further advantage of the invention is that the roasted product is cooled without being removed from the drum, and therefore divested totally of its thermal inertia in a way not hitherto possible; in conventional equipment, in fact, the roast will continue while the product is being discharged into or conveyed toward the cooling station, and cooling is effected at ambient temperature.

Another advantage of the equipment disclosed is that raw commodities can be roasted without losing their aroma, and indeed can be supplemented with a variety of aromas to create determined flavors, thanks to the inclusion of a device for the purpose located prior to and in parallel with the cooling system.

Yet another advantage of the invention stems from the uniform heating action to which a raw commodity is subjected internally of the planet drums. This is achieved by utilizing drums of frusto-conical or frusto-biconical shape provided with inner elements of similar but inverted frusto-conical or frusto-biconical shape, respectively (i.e. inserted with their larger and smaller bases the opposite way about to those of the drums), and incorporating a volute by which the commodity is transferred from the drum to the inner conical or biconical element, and thus forced to move continually along the axis of the drum.

BRIEF DESCRIPTION OF THE DRAWINGS

The invention will now be described in detail, by way of example, with the aid of the accompanying drawings, in which:

FIG. 1 is a schematic representation of equipment disclosed, in which the main carrier drum is viewed in side elevation;

FIG. 2 is an axial section through one of the planet drums;

FIG. 3 is the section through III—III in FIG. 2;

FIG. 4 is an enlargement of the central part of the carrier drum illustrated in FIG. 1;

FIG. 5 shows an alternative embodiment of the drum illustrated in FIG. 3;

FIG. 6 shows an alternative embodiment of the drum illustrated in FIG. 2.

DESCRIPTION OF THE PREFERRED EMBODIMENTS

With reference first to FIG. 1, roasting equipment according to the invention comprises:
- a feeder 1 supplying the raw commodity 2;
- a device 3 for treatment of the raw commodity 2;
- a separator-and-disposal unit 5 connected to an extractor 19;
- means 70 of generating a hot fluid, generally air, well known in the art;
- a cooling system 7;
- a discharge outlet 4.

In equipment embodied according to the invention, the device 3 in which a raw commodity undergoes treatment comprises a drum 3a divided around its circumference, by baffles 16, into at least four distinct and independent sectors 17, each of which provided with at least one inlet 22 and one outlet 23 admitting passage of the commodity, and an inlet 30 and an outlet 26 admitting passage of a fluid. The drum 3a is caused to turn about an axis 3b of rotation by drive means (not illustrated), in such a way that the sectors 17 are taken progressively through a succession of four work stations 12, 13, 9 and 14, with the commodity 2 being subjected to a given treatment at each such station.

In the preferred embodiment illustrated, each of the sectors 17 accommodates a relative internal, or planet drum 8, that is carried by the main drum 3a and designed to receive a prescribed quantity of the raw commodity 2. The minimum number of planet drums 8 would be four, i.e. one drum per station, though the example of the drawings has nine, for reasons that will become apparent in due course. Each of the planet drums 8 turns on its own axis of rotation, which is disposed parallel to that of the main drum 3a.

The feeder 1, hot air generator, extractor 19 and cooling system 7 all connect with the main drum 3a at points around its periphery which are spaced apart by a distance equal to the circumferential length of one sector 17, or a multiple thereof. According to the invention, the discharge outlet 4 is also connected directly with the main drum 3a, at a point below its horizontal diametrical plane marginally preceding the link with the feeder 1, considered in relation to the direction of rotation of the drum denoted by the arrow f.

Still referring to FIG. 1, the work stations are ranged around the drum 3a and along the direction of rotation f thus: first, the charging station 12, which coincides with the outlet from the feeder 1, next, the heating and roasting station 13, and thereafter, the cooling station 9 and the discharge station 14. Each such work station may be occupied by one or more of the planet drums 8 at any one time, as discernable in the case of the heating and roasting stations 13, which, in the case of the embodiment shown, can accommodate six drums 8. The outlet 26 from each sector 17 coincides with and comprises a longitudinal opening 26 occupying the straight line portion 69 of the sector 17 that is positioned lowest at the moment when the sector is over the discharge outlet 4 as shown in FIG. 1.

The fluid inlet passages 29 of the sectors 17 coincide with the relative passages 30 of a valve stator 28 connecting with the hot air generator, as well as with a supply of cold fluid, generally air.

In the example of the equipment illustrated, the stator 28 appears as a hollow cylindrical element encircled in a substantially fluid-tight fit by the carrier drum 3a, which is annular in embodiment and breasts with the stator 28 via an inner cylindrical surface that also establishes the internal boundary of the sectors 17; the inlet passages 29 are thus incorporated into the inner cylindrical surface 27, and positioned to correspond with the passages 30 in the stator 28, both sets of passages 29 and 30 comprises a plurality of openings spaced apart regularly around the periphery of the stator.

Three ducts 31 are routed from the cooling system 7 into the stator 28, the flow from each such duct being directed through two adjacent passages 30; accordingly, the ducts serve six passages 30, and more exactly, the passages into the six sectors 17 accommodating the six drums 8 occupying the heating and roasting station 13. The remaining passages 30 are isolated from the interior of the stator 28 by a circumferential sector 35, the first of the three passages (considered in relation to the direction of rotation f) being separated from the remaining two by a web 36 bridging the sector 35. Immediately upstream of the six open passages 30, each duct 31 from the cooling system is divided by a respective central baffle 32 into subsidiary ducts 33, each controlled by a relative shut-off valve 34 and occupying only a part of the total area, e.g. half, of the passage 30 it serves.

A further dividing baffle 37 is located between each two adjacent ducts 31, and combines with them to establish two further subsidiary ducts 38, also controlled by relative shut-off valves 39, each one of which communicates with a respective passage 30. Thus, each passage 30 that serves the heating and roasting station is caused to communicate with one subisidiary duct 33 in receipt of cold air from the duct 31 connecting with the cooling system, and at at the same time, with a duct 38 admitting hot air from the interior of the stator 28.

The shut-off valves 34 and 39 might be operated by relative knobs located on the side of the drum 3a, or alternatively, interlocked to a CPU by which the entire set of valves 34 and 39 will be regulated according to the properties of the raw commodity 2, and of the end product to be obtained therefrom. 18 denotes a manifold located externally of the carrier drum 3a and connecting with the outlets 26 of the sectors 17 currently occupying the heating and roasting station 13 by way of relative ducts 18a that slide against the exterior of the carrier drum 3a in a fluid-tight fit. The manifold connects with the intake of the extractor 19, the function of which is to draw air from the sectors 17 that occupy the heating and roasting station 13, with the result that these sectors will be evacuated to a given degree.

Air drawn in by the extractor 19 is transferred to the separator-and-disposal unit 5, and a proportion of this same air, freed of skins or husks 6 that may have been shed by the commodity in the heating and roasting station 13, is routed from the outlet of the separator 5 into the cooling system 7.

According to the invention, the temperature of this air, freed of unwanted matter 6 though retaining the aroma from the roast, is lowered to a level below ambient, whereupon the air itself is directed by a further extractor 40 back into the part of the stator 28 enclosed by the sector 35 and the web 36, and more exactly, into the passage 30 farthest back of the three isolated by the sector 35. The option also exists of coupling a device into the line 41 from the extractor 40 to the carrier drum 3a such as will permit of adding an aroma that will invest the roasted product 10 with a given flavor.

The discharge outlet 4, which is located below the relative work station 14 of the main drum 3a, is conventional, and therefore not described.

The planet drums 8 are constructed in such a way as to empty swiftly at the discharge outlet 14. In the embodiment of FIG. 2, the shell of the single drum comprises two frusto-conical sections 20 and 21 mounted coaxially to a central shaft 43 journaled to the side walls 44 and 45 of the main drum 3a. The two sections 20 and 21 will be embodied for the most part in mesh or otherwise perforated material, in order to enable the passage of air.

One of the two frusto-conical shell sections, for example that denoted 21 (on the left in FIG. 2), is rigidly attached to and carried on the shaft 43 by two braces 46. The smaller base of this section 21 registers in an annular recess 47 formed in the relative side wall 44 of the carrier drum 3a whilst remaining capable of movement in relation thereto; contact between the two drums 3a and 8 occurs by way of an annular reinforcing member 48 associated with the base of the relative section 21.

49 denotes a port in the side wall 44 of the main drum 3a, coinciding with the annular recess 47, that is normally closed by a shut-off valve 50, say of poppet type, biased into the closed position (see FIG. 2) by a spring ensheathing its stem. The port 49 is located above the shaft 43 to optimize charging of the drum 8, as will become clear in due course. A short length of tube located externally of the each drum 8 combines with the port 49 to create the relative inlet 22 aforementioned.

The remaining frusto-conical element 20 is mounted to the shaft 43 in axially slidable fashion, on the one hand by way of a flange 51 associated with its smaller base, and on the other, by way of a set of pins 52 distributed around the periphery of the larger base and engaging in corresponding holes afforded by a ring 53 associated with the larger base of the fixed shell section 21. The shaft 43 is ensheathed at one end, externally of the drum 8, by a coil spring 54 one end of which registers against the flange 51; the remaining end of the spring 54 is seated against a shoulder offered by the shaft itself, in such a way that the larger base of the one frusto-conical section 20 is urged constantly into contact with that of the other section 21, thereby forming the shell of the planet drum 8 into which the raw commodity 2 is charged. Means (not illustrated) will also be included, e.g. a lever, by which to distance the slidable section 20 from the remaining section 21 against the action of the spring 54 whenever the relative sector 17 occupies the charging station 12.

56 denotes means, keyed to the shaft 43 externally of the side wall 45 of the carrier drum 3a, whereby the planet drum 8 is caused to rotate in relation to the carrier drum 3a, preferably in the same direction. Such means might be embodied as a gear driven by way of a suitable train of wheels from a pinion keyed to the shaft of the main drum 3a. 23 denotes a stirring device located internally of the drum 8, which comprises an inner element 24 of frusto-biconical shape encompassed entirely by the biconical shell 20 and 21 of the drum. It will be seen, however, that the biconical shape of the element 24 is inverted, with the smaller bases of the frusts united at center rather than the larger bases, in contrast to the shell sections 20 and 21 of the drum.

The frusto-biconical element 24 exhibits open ends and is supported by two braces, 46 and 55, located respectively at the inlet and spring ends. Like the shell sections 20 and 21, the inner element 24 will be embodied in mesh or other perforated material. The stirring device 23 also comprises a volute 25, occupying the space between the shell sections 20 and 21 and the inner frusto-biconical element 24 and supported at least by the central waisted part of the inner element 24, which spirals in the same direction f as that in which the drum rotates (see FIG. 3) and communicates with the space encompassed by the inner element 24; thus, as the planet drum 8 rotates, the commodity 2 is scooped up from the frusto-conical shell sections 20 and 21 and churned back continuously into the inner element 24.

Operation of the equipment will now be described with reference to just one of the planet drums 8, given that all function in exactly the same manner, albeit at staggered intervals.

A prescribed quantity of the raw commodity 2 is batched by the feeder 1 into the carrier drum 3a at the charging station 12. The carrier drum 3a may either index from one station to the next, moving through an angular distance equal to one sector 17, or rotate continuously; in either event, a given planet drum 8 will occupy the station 12 at any one time, its inlet 22 offered to the feeder 1.

The shut-off valve 50 opens to admit the commodity, which duly descends through the port 49 and into the drum 8, gaining the inside both of the inner element 24 and the nearer shell section 21.

As the drum 8 rotates, the commodity 2 will drift along the downwardly diverging surfaces of the inner element 24 and drop from either end onto the downwardly converging surfaces of the two shell sections 20 and 21, sliding ultimately toward the central area of maximum space which accommodates the volute 25. With the drum 8 continuing to turn, the commodity 2 is taken up in the volute 25 and returned to the central waisted part of the inner element 24, from where it descends to the bottom of the drum again as before. Thus, continued rotation of the planet drum 8 causes the commodity to be kept constantly in motion both around the axis of rotation, and along it in either direction. As this movement continues, the drum 8 itself is conveyed into the heating and roasting station 13 by ongoing rotation of the carrier drum 3a.

At the moment when the fluid inlet passage 29 of the sector 17 begins to move into alignment with the passage 30 of the valve stator 28 served by the first two air ducts 38 and 33, the sector 17 itself will be invested by the already mixed flow of air that enters. The quantity of air supplied through the ducts 33 and 38 is determined by the degree to which the relative valves 34 and 39 are opened; accordingly, the sector 17 may be filled with hot air only from the one duct 38 or with cold air only from the other duct 33, or alternatively, with warm air supplied at a temperature determined by the relative quantities of air admitted from both ducts 33 and 38. Given that each passage 30 of the valve stator 28 is served by a cold air duct 33 and a hot air duct 38 that are adjustable independently of the ducts serving the remaining passages, the six sectors 17 that occupy the heating and roasting station 13 can be subjected to varying temperature levels, for example rising initially and then falling, according to the required characteristics of the roasted product 10. Should it be found, say, that the temperature of the commodity 2 internally of the fifth sector 17 is too high, then the sixth passage 30 of the station 13 might be made to admit cold air only, or blocked altogether.

As the carrier drum 3a passes through the heating and roasting station 13, there will be a degree of negative pressure maintained by the extractor 19 in the relative sectors 17, such as ensures a steady intake of hot and cold air from the generator and the cooling system. Air drawn into the manifold 18 by the extractor 19, which carries the aroma of the commodity roasted in the drums 8, will also entrain husks, or skins 6 etc. that separate from the beans or nuts when heated. This same air is directed by the extractor 19 into the separator-and-disposal unit 5, where the waste matter 6 is removed, thence into the cooling system 7; the temperature of the air, still laden with the aroma, is now lowered to a level less than ambient (say, to 5° C. approx), before being returned by the relative extractor 40 to the cooling station 9 enriched, if so desired, with additional aromas from the device denoted 42. Thus, as soon as the fluid inlet passage 29 of the sector 17 moves into alignment with the passage 30 of the cooling station 9, the sector will be filled with air supplied at below-ambient temperature and laden, on the one hand, with the now recycled aroma given off during the roast, and on the other, with added aromas from the relative device 42.

The roasted product 10 is in fact still hot at this juncture, and markedly hygroscopic, so that it will entirely absorb the aroma-laden moisture in the air supplied to the station 9 before cooling swiftly on exposure to the lower temperature. The air that remains in the sector 17 at the cooling station 9 is substantially odorless, following absorption of the aroma by the roasted product 10, and can be taken out by a further extractor 57 and exhausted into the atmosphere.

On arrival of the sector 17 at the final discharge station 14, the sliding shell section 20 of the drum 8 will be distanced from the fixed section 21, enabling the now roasted and cooled end product 11 to drop into the sector 17, through the opening 26, and into the discharge outlet 4. The frusto-conical embodiment of the drum 8 favors swift discharge of the contents, and continued rotation ensures that the volute 25 and the inner element 24 are emptied totally.

The single sector 17 considered thus completes its working cycle and passes forward into the charging station 12 to begin a fresh cycle, whereupon the sector 17 next in line will proceed to terminate its cycle by discharging in similar fashion.

One immediately apparent advantage of the equipment disclosed is that of its ability to operate either continuously, or intermittently; operation remains essentially continuous even in the latter instance, however, inasmuch as each step indexed brings one of the planet drums 8 into the discharge station 14 with its prescribed quota of the correctly roasted and cooled end product 11.

By apportioning the raw commodity 2 between several individual drums 8 and keeping it in movement both along and around the axis of each one, it becomes possible to avoid any accumulation of the commodity at the bottom of the revolving enclosure that would prevent a uniform distribution of heat, and thus produce an uneven roast.

Similarly advantageous is the recycling of hot air from the roast back into the cooling system, which avoids loss of aroma from the product, as well as contributing to a cleaner environment.

The embodiment of the planet drum 8 illustrated in FIG. 5 differs from that of FIG. 2 in that it has a shell 210 of plain frusto-conical shape; similarly, the element 230 of the stirring device appears as a single cone frustum 240, its smaller base located to coincide with the larger base of the shell 210, and the volute 250 is positioned between these two respective bases, no longer central. The operation of this embodiment remains substantially the same as already described, with discharge effected by sliding the shell 210 axially in relation to the inner element 240.

In a further embodiment illustrated in FIG. 6, the shell of the drum 8 is constructed in two sections 20 and 21 as in FIG. 2, though exhibiting a purely elliptical longitudinal profile; more exactly, the longer axis of the ellipse coincides with the axis of rotation, and the shorter, substantially with the join between the sections. Stirring and final discharge of the end product 11 are assisted by the action of elongated blades inside the drum 8, which are shaped in such a way as to bounce the beans or nuts toward the central area of the drum, thereby offsetting the centrifugal force (strongest at the middle where mass is greatest) that tends naturally to flatten the charge and spread it to either side; once the centrifugal force and the effect of the blades are balanced, conditions in the drum become essentially stable, and the charge can distribute itself uniformly inside the enclosure instead of bunching and disallowing a smooth stir.

The foregoing specification implies no limitation; for example, the fluid inlet passages 29 of the carrier drum 3a might be located in one of the side walls 44 or 45, and the valve stator 28 breasted frontally with the wall utilized. Similarly, the charging and discharge stations 12 and 14 might be merged into one. The phantom line of FIG. 1 shows an alternative location of the separator-and-disposal unit 5, which in this instance is connected at a point following the extractor denoted 57; thus, air in the sector 17 occupying the cooling station 9 is drawn out by the extractor 57 and exhausted into the separator 5, which in turn exhausts into the cooling system 7 so that the air is recycled back into the drum 3a at the cooling station 9 in the manner already described—i.e. returning by the way of the extractor denoted 40 and, if so envisaged, enriched aromatically by the relative device 42.

What is claimed:

1. Equipment for roasting coffee, hazelnuts, peanuts and similar commodities, comprising:

a feeder dispensing said raw commodity;

a treatment device for treatment of each charge of said raw commodity dispensed by the feeder, said treatment device including a carrier drum rotatable about its own axis and at least four distinctly embodied, independent and modular peripheral sectors, each said sector being designed to contain a prescribed quantity of said raw commodity and being provided with at least one fluid inlet and one fluid outlet for passage of a fluid, a sector inlet to admit said raw commodity, and a sector outlet from which to discharge said raw commodity after being treated;

hot fluid generating means for generating a hot fluid, and for connecting said hot fluid in communication with said treatment device so as to be capable of roasting said raw commodity in said treatment device and producing a roasted product from said raw commodity;

a separation and disposal unit for separation and disposal of waste matter that may be shed by said raw commodity during said roasting in said heat treatment device;

a cooling system for generating a cold fluid and for connecting said cold fluid in communication with said treatment device so as to be capable of lowering the temperature of said roasted product to produce a roasted end product;

a discharge outlet for discharging said roasted end product which has been discharged through said sector outlet;

a succession of distinct work stations comprising, a charging station formed by said feeder being connected with said treatment device, a heating and roasting station formed by said hot fluid generating means and said separation and disposal unit being connected with said treatment device, a cooling station formed by said cooling system being connected with said treatment device, and a discharge station formed by said discharge outlet being connected with said treatment device, said sectors of said treatment device being conveyed and brought into operable association with each said work station by rotation of said drum and by way of said inlets and/or outlets, and said work stations being arranged with respect to said sectors such that each said work station is occupied by at least one sector at any given moment.

2. Equipment as in claim 1, wherein each said sector accommodates a relative drum charged with said raw commodity, and is rotatable about its own axis.

3. Equipment as in claim 2 wherein said treatment device further comprises a valve stator capable of receiving hot fluid from said hot fluid generating means, and cold fluid from a cold fluid source of said cooling system, said valve stator having one passage for each of the sectors occupying said heating and roasting station, wherein said hot and cold fluids are directed into each said passage from two variable-flow ducts, one said variableflow duct being independently connected with said hot fluid generating means and the other said variableflow duct being independently connected with said cold fluid source.

4. Equipment as in claim 3, wherein said valve stator comprises a hollow cylindrical structure ensheathed by said carrier drum in a fluid-tight fit manner, wherein said passages comprise a succession of radial openings through which access is afforded to the sectors occupying said heating and roasting station, and wherein the surface of each sector that breasts with said valve stator incorporates one of said fluid inlets positioned in such a way as to align with the relative passage in the stator as the carrier drum rotates.

5. Equipment as in claim 3, wherein said valve stator has a passage that aligns with said sector inlet of the sector occupying said cooling station and is in fluid communication with said cooling fluid from the cooling system.

6. Equipment as in claim 3, wherein said cooling fluid is supplied to the carrier drum from the cooling system at a temperature lower than ambient temperature.

7. Equipment as in claim 6, wherein said cooling fluid supplied from the cooling system, comprises at least in part, recycled heating fluid that is drawn from the heating and roasting station into the separation and disposal unit, cleansed of waste matter, and returned to the carrier drum.

8. Equipment as in claim 6, wherein the cooling fluid supplied to the carrier drum from the cooling system is enriched aromatically prior to entering the valve stator.

9. Equipment as in claim 2, wherein the relative drum accommodated by each sector includes a frusto-conical shell section comprising two coaxially disposed frusto-conical sections with each frusto-conical section having an outwardly directed smaller cone base and an inwardly directed larger cone base, said outwardly directed smaller cone bases of each said frusto-conical section being enclosed and at least the revolving surfaces embodied in a perforated material such as will allow the passage of air, arranged with their larger cone bases in mutual contact and in such a way that one section can be shifted in relation to the other at least when the relative drum occupies the discharge station, and wherein each said relative drum has one of said sector inlets incorporated into one of the two frusto-conical sections and which is offered to the feeder at least when the relative drum occupies the charging station.

10. Equipment as in claim 9, wherein the relative drum accompanied by each peripheral sector incorporates an internal stirring device that comprises an open ended hollow frusto-biconical element, waisted at center and with at least its revolving surface embodied in a perforated material, and a volute that extends between the periphery of the larger cone bases of the shell and the smaller cone bases of the frusto-biconical element, spiraling in the same direction as that in which the shell section rotates, in such a way that the commodity is scopped up from the frusto-conical shell and transferred to the frusto-biconical element.

11. Equipment as in claim 9, wherein said carrier drum includes a flat side on an end of said carrier drum, and wherein the smaller cone base of the frusto-conical shell section is enclosed by the flat side wall of the carrier drum, and registers slidably in a substantially fluid-tight fit with an annular recess afforded by the flat side wall, and wherein the sector inlet is located in said flat side wall and encompassed by the annular recess.

12. Equipment as in claim 2, wherein the relative drum accommodated by each peripheral sector, comprises a shell of frusto-conical shape having a large cone base and a small cone base, said bases being enclosed and at least the revolving surface of said shell embodied in a perforated material such as will allow the passage of air, and a normally closed sector inlet that is offered to the feeder at least when the relative drum occupies the charging station.

13. Equipment as in claim 12, wherein the relative drum accommodated by each peripheral sector incorporates an internal stirring device that comprises an open ended hollow frusto-conical inner element having a small cone base and a larger cone base, said smaller base being positioned to coincide with the larger cone base of the shell and at least the revolving surface of which is embodied in a perforated material, and a volute that extends between the periphery of the larger cone base of the shell and the smaller cone base of the frusto-conical inner element, spiraling in the same direction as that in which the shell rotates, in such a way that the commodity is scooped up from the frusto-conical shell and transferred to the frusto-conical inner element.

14. Equipment as in claim 13, wherein said carrier drum includes a flat side wall on an end of said carrier drum and wherein the larger cone base of the frusto-conical shell is enclosed by the flat side wall of the carrier drum, and registers slidable in a substantially fluid-tight fit with an annular recess afforded by the flat side wall, and wherein the sector inlet is located in said flat side wall and encompassed by the annular recess.

15. Equipment as in claim 2, wherein said relative drum accomodated by each sector includes a shell comprising two coaxially disposed mutually contacting sections exhibiting a semi-elliptical longitudinal profile, which when considered in relation to an ellipse, the longer axis of said two sections coincides with the axis of rotation of the relative drum, and the shorter axis coincides substantially with the plane of mutual contact between the two sections.

16. Equipment as in claim 1, further comprising a manifold located externally of said carrier drum in a fixed position that coincides with said heating and roasting station, said manifold having a plurality of ducts and said hot fluid in said treatment device used during said roasting being drawn through at least one said duct positioned in such a way as to connect with said sector outlet of each sector occupying the heating and roasting station, wherein the manifold connects with the inlet of an extractor, and the outlet of the extractor is connected in turn to the inlet of said separation and disposal unit.

17. Equipment as in claim 1, wherein the treatment device comprises at least nine sectors spaced apart at identical angular distance, and at least six sectors can be accommodated by said heating and roasting station at any one time.

18. Equipment as in claim 1, wherein said sector outlet of each said sector coincides with the discharge outlet, when the sector occupies the discharge station.

* * * * *